(12) United States Patent
Wang et al.

(10) Patent No.: US 9,900,589 B2
(45) Date of Patent: Feb. 20, 2018

(54) DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Huan Wang, Beijing (CN); Mookeun Shin, Beijing (CN); Zhizhong Tu, Beijing (CN); Yongjun Yoon, Beijing (CN)

(73) Assignees: BOE Technology Group Co., Ltd., Beijing (CN); Hefei BOE Optoelectronics Technology Co., Ltd., Hefei, Anhui (CN)

( * ) Notice: Subject to any disclaimer, the term of this patent is extended or adjusted under 35 U.S.C. 154(b) by 30 days.

(21) Appl. No.: 14/426,004

(22) PCT Filed: May 30, 2014

(86) PCT No.: PCT/CN2014/078926
§ 371 (c)(1),
(2) Date: Mar. 4, 2015

(87) PCT Pub. No.: WO2015/090009
PCT Pub. Date: Jun. 25, 2015

(65) Prior Publication Data
US 2016/0014399 A1    Jan. 14, 2016

(30) Foreign Application Priority Data
Dec. 20, 2013    (CN) .......................... 2013 1 0718373

(51) Int. Cl.
G09G 3/36        (2006.01)
H04N 13/04       (2006.01)
H04N 9/31        (2006.01)

(52) U.S. Cl.
CPC ....... *H04N 13/0422* (2013.01); *H04N 9/3129* (2013.01); *H04N 9/3161* (2013.01); *H04N 13/0425* (2013.01); *H04N 13/0431* (2013.01)

(58) Field of Classification Search
CPC ............ G02B 27/2228; G02B 27/2235; G02B 27/225; G02B 27/2214; G02B 27/2257;
(Continued)

(56) References Cited

U.S. PATENT DOCUMENTS

2008/0278807 A1    11/2008  Richards et al.
2010/0073600 A1*    3/2010  Itoh ..................... G02B 6/0028
                                                    349/65

(Continued)

FOREIGN PATENT DOCUMENTS

CN        1805229 A      7/2006
CN      101795420 A      8/2010
(Continued)

OTHER PUBLICATIONS

Notification of the First Office Action dated Feb. 4, 2014 corresponding to Chinese application No. 201310718373.8.
(Continued)

*Primary Examiner* — Jennifer Nguyen
(74) *Attorney, Agent, or Firm* — Nath, Goldberg & Meyer; Joshua B. Goldberg

(57) ABSTRACT

The present invention provides a display device, relates to the field of display technology, and can solve the technical problems of large volume and high cost in existing spectral separation 3D display device. The display device comprises: a display light source comprising at least one monochromatic wavelength tunable laser, when displaying each piece of 3D images, the monochromatic laser is capable of at least emitting a first laser beam at a first time, and emitting a second laser beam at a second time, and the peak wavelength (Continued)

of the first laser beam is different from that of the second laser beam, wherein the first time and the second time are continuous, the first laser beam is used for displaying the first frame of image, the second laser beam is used for displaying the second frame of image.

13 Claims, 5 Drawing Sheets

(58) Field of Classification Search
CPC ........... H04N 13/0418; H04N 13/0422; H04N 13/0425; H04N 9/3129; H04N 13/0431; G09G 3/22; G09G 3/34; G09G 3/3413
USPC ............................................. 345/34, 87, 102
See application file for complete search history.

(56) References Cited

U.S. PATENT DOCUMENTS

| | | | |
|---|---|---|---|
| 2011/0063574 A1 | 3/2011 | Freeman | |
| 2012/0105807 A1 | 5/2012 | Volpe et al. | |
| 2013/0182322 A1* | 7/2013 | Silverstein | G02C 7/107 |
| | | | 359/464 |
| 2014/0267456 A1* | 9/2014 | Ando | G09G 3/001 |
| | | | 345/690 |

FOREIGN PATENT DOCUMENTS

| | | | |
|---|---|---|---|
| CN | 101900882 A | 12/2010 | |
| CN | 201886734 U | 6/2011 | |
| CN | 102478217 A | 5/2012 | |
| CN | 102798979 A | 11/2012 | |
| CN | 103048794 A | 4/2013 | |
| CN | 103430555 A | 12/2013 | |
| CN | 103716614 A | 4/2014 | |
| CN | 203645134 U | 6/2014 | |
| EP | 2624573 * | 7/2013 | ............. H04N 13/04 |

OTHER PUBLICATIONS

Notification of the Second Office Action dated Aug. 7, 2015 corresponding to Chinese application No. 201310718373.8.
Written Opinion of the International Searching Authority dated Sep. 29, 2014 corresponding to International application No. PCT/CN2014/078926.

* cited by examiner

DISPLAY DEVICE

This is a National Phase Application filed under 35 U.S.C. 371 as a national stage of PCT/CN2014/078926, filed May 30, 2014, an application claiming the benefit of Chinese Application No. 201310718373.8, filed Dec. 20, 2013, the content of each of which is hereby incorporated by reference in its entirety.

FIELD OF THE INVENTION

The present invention relates to the field of display technology, in particular to a display device.

BACKGROUND OF THE INVENTION

Spectral separation technology is an advanced stereoscopic display technology implemented in a 3D display device.

A 3D display apparatus comprises: a display light source, the display light source uses two or more groups of laser light sources which are spectral separated, and laser beams of the same color emitted from different groups of laser light sources have different peak wavelengths. In an example where two groups of laser light sources are used, each group includes three monochromatic lasers, i.e. a red laser, a blue laser and a green laser, and laser beams emitted by two monochromatic lasers of a same color from the two groups of laser light sources have different peak wavelengths. At this time, two red lasers emit red laser beam 1 and red laser beam 2 respectively, two green lasers emit green laser beam 1 and green laser beam 2 respectively, two blue lasers emit blue laser beam 1 and blue laser beam 2 respectively. There is no spectral overlap between the two groups of laser light sources. An image formed by the red laser beam 1, the green laser beam 1 and the blue laser beam 1 enters into one human eye, and an image formed by the red laser beam 2, the green laser beam 2 and the blue laser beam 2 enters into the other eye, thereby forming a three-dimensional image. A pair of narrow band filter glasses receives the red laser beam, the green laser beam and the blue laser beam after spectral separation. The main difference of the spectral separation stereoscopic imaging technology from conventional stereoscopic imaging technology is that by using spectral separation, the left eye image and the right eye image can be separated highly. The image is separated based on wavelengths of light of different colors, without any signal conversion process, thus the spectral separation stereoscopic imaging technology is also known as passive stereoscopic imaging. Compared to conventional stereoscopic imaging technology, the spectral separation display technology has the following advantages: 1, the pair of the left eye image and the right eye image are strictly filtered and separated highly, so that no ghost image appears when viewing stereoscopic image by wearing glasses; 2, the image quality is good and flicker-free, the wearer is comfortable and does not feel dizzy in durable watching; 3, the glasses do not require battery and complex circuitry, thus have lightweight and better comfort; 4, no signal synchronization emitter is required, the head can move freely, the wearers do not interfere with each other, thus the technology can meet the occasions having lots of spectators.

The inventors found that at least the following problems exist in the prior art: a group of monochromatic laser is required to generate a group of laser light source; take the above 3D display device for stereoscopic display as an example, in short, two groups of laser light sources emit six monochromatic laser beams (i.e. the red laser beam 1 and red laser beam 2, green laser beam 1 and green laser beam 2, blue laser beam 1 and blue laser beam 2), six monochromatic lasers in total are required; that is, each monochromatic laser emit a laser beam having a peak wavelength. Therefore the 3D display device has large volume and high cost.

SUMMARY OF THE INVENTION

To solve the above problems in the existing 3D display device, the present invention provides a compact display device which can be implemented with low cost.

To solve the above technical problem, the present invention provides a technical solution of a display device, comprising: a display light source, the display light source comprises at least one monochromatic wavelength tunable laser, when displaying each piece of 3D images, the monochromatic laser is capable of at least emitting a first laser beam at a first time, and emitting a second laser beam at a second time, and the peak wavelength of the first laser beam is different from that of the second laser beam, wherein the first time and the second time are continuous, the first laser beam is used for displaying the first frame of image, the second laser beam is used for displaying the second frame of image.

The monochromatic laser in the display device of the present invention is capable of emitting a first laser beam at a first time, and emitting a second laser beam at a second time, and the peak wavelength of the first laser beam is different from that of the second laser beam. As compared to the existing display light source which requires two monochromatic lasers to emit two laser beams having the same color and having different peak wavelengths at two neighboring times, the display device of the present embodiment has a much compact structure and lowered production costs.

Preferably, the display light source comprises three monochromatic wavelength tunable lasers, the monochromatic laser is any one from a red laser, a green laser and a blue laser.

The first laser beam includes a first red laser beam, a first green laser beam and a first blue laser beam, wherein at the first time, the red laser emits the first red laser beam, the green laser emits the first green laser beam, the blue laser emits the first blue laser beam;

the second laser beam includes a second red laser beam, a second green laser beam and a second blue laser beam, wherein at the second time, the red laser emits the second red laser beam, the green laser emits the second green laser beam, the blue laser emits the second blue laser beam.

Preferably, the display light source further comprises: a signal generation module, a laser driving module and a controller.

The controller controls the signal generation module to generate different current signals, the signal generation module supply the different current signals to the laser driving module, the laser driving module generates different driving currents based on the received different current signals for driving the corresponding monochromatic laser to emit the first laser beam or the second laser beam.

Further preferably, the display light source further comprises: a monitoring module.

The monitoring module is connected to the corresponding monochromatic laser and is configured for detecting the peak wavelength of laser beam emitted by the monochromatic laser, the monitoring module also feedback the beam peak wavelength of the first laser beam or the second laser beam to the controller, so as to adjust the current output of the laser driving module.

Further preferably, the display light source further comprises: an automatic control module.

The monitoring module feedbacks the beam peak wavelength of the first laser beam or the second laser beam to the controller through the automatic control module, so as to adjust the current output of the laser driving module.

Further preferably, the display light source further comprises: a coupler.

The monochromatic lasers are respectively connected to the coupler through optical fiber, for transmitting the first laser beam or the second laser beam emitted at a same time to the display module through the same propagation path via the coupler, so that the display device displays images.

Further preferably, the display light source further comprises: a projection module.

The projection module is disposed between the coupler and the display module, and is configured for processing the laser beams output from the coupler and projecting them on the display module to display the corresponding image.

Further preferably, the display light source further comprises: at least one scattering rod and a light guide plate.

The scattering rod is used for scattering the laser beam from the coupler, and forming a surface light source by the light guide plate.

Further preferably, the display light source further comprises a reflective shade, the scattering rod comprises: a scattering rod cavity, and scattering particles provided in the scattering rod cavity, a laser inlet is provided at one end of the scattering rod cavity and a reflector is provided at the other end, the reflective shade is disposed on a side of the scattering rod cavity away from the light guide plate, the reflector and the reflective shade together reflect the laser beams to the light guide plate.

Preferably, the display light source is a laser light source array.

The laser light source array comprises a red laser light source, a green laser light source, a blue laser light source which are disposed with space, and each of the red laser light source, the green laser light source and the blue laser light source include at least one laser light.

DESCRIPTION OF THE PREFERRED EMBODIMENT

Figure 1:
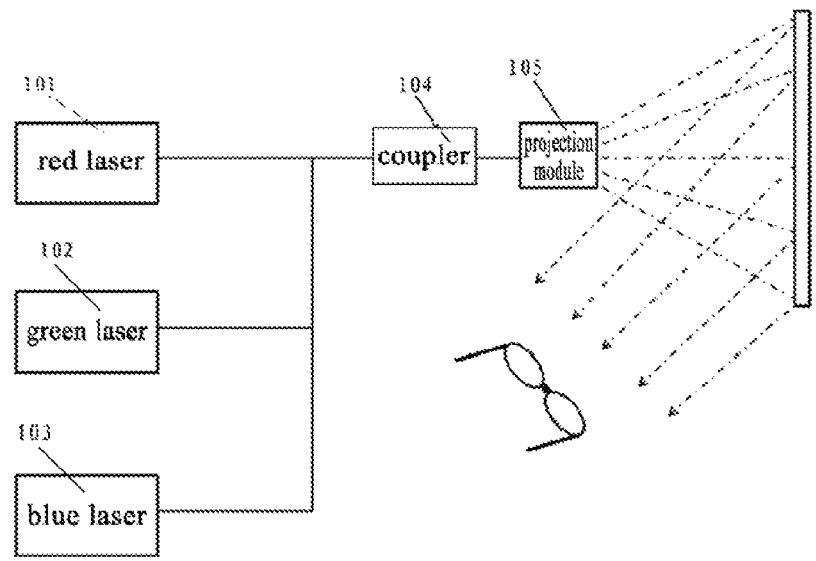
FIG. 1 is a schematic view of a back projection display device in a first embodiment of the present invention.

To make those skilled in the art better understand the technical solutions of the present invention, the present invention will be described below in details in conjunction with the accompanying drawings and specific implementations.

First Embodiment

As shown in FIGS. 1 through 9, the present embodiment provides a display device, comprising: a display light source, the display light source comprises at least one monochromatic wavelength tunable laser, when displaying each piece of 3D images, the monochromatic laser is capable of at least emitting a first laser beam at a first time, and emitting a second laser beam at a second time, and the peak wavelength of the first laser beam is different from that of the second laser beam, wherein the first time and the second time are continuous, the first laser beam is used for displaying the first frame of image, the second laser beam is used for displaying the second frame of image.

The monochromatic laser in the display device of the present embodiment is capable of emitting a first laser beam at a first time, and emitting a second laser beam at a second time, that is, one monochromatic laser is capable of emitting two laser beams having the same color and having different peak wavelengths at two neighboring times. As compared to the existing display light source which requires two monochromatic lasers to emit two laser beams having the same color and having different peak wavelengths at two neighboring times, the display device of the present embodiment has a much compact structure and lowered production costs.

Note that, the display device provided in the present embodiment needs cooperation of narrow-band filter glasses to realize 3D display. The lens of the narrow-band filter glasses are filters having band-pass function for particular wavelengths, and preferably are filters having band-pass function for red, green, and blue colors, especially having narrow-band band-pass function for spectrum of particular bands of red, green, and blue colors. The filters usually consist of notch filters. With above-described narrow-band filter glasses, the 3D image can be viewed.

Preferably, the display light source of the present embodiment comprises three monochromatic wavelength tunable lasers, the three monochromatic lasers include a red laser 101, a green laser 102 and a blue laser 103, wherein at the first time, the red laser 101 emits a first red laser beam, the green laser 102 emits a first green laser beam, the blue laser 103 emits a first blue laser beam, and the first red laser beam, the first green laser beam and the first blue laser beam are used for displaying the first frame of image; and at the second time, the red laser 101 emits a second red laser beam, the green laser 102 emits a second green laser beam, the blue laser 103 emits a second blue laser beam, and the second red laser beam, the second green laser beam and the second blue laser beam are used for displaying the second frame of image. The first frame of image and the second frame of image enter the left and right eyes of the viewer respectively, so that a 3D image is formed.

Of course, it may be that only one or two among the red laser 101, the green laser 102, the blue laser 103 in the display light source are monochromatic wavelength tunable laser(s). In these cases, the display device of the present embodiment also has a much compact structure and lowered production costs.

The peak wavelength of laser beam emitted from the monochromatic laser is typically adjusted by current regulation. In the present embodiment, preferably, the display light source further comprises: a signal generation module, a laser driving module and a controller. The controller controls the signal generation module to generate different current signals, the signal generation module supply the different current signals to the laser driving module, the laser driving module generates different driving currents based on the received different current signals for driving the corresponding monochromatic laser to emit the first laser beam or the second laser beam. That is, based on different driving currents, laser beams with different peak wavelengths are emitted.

Figure 2:
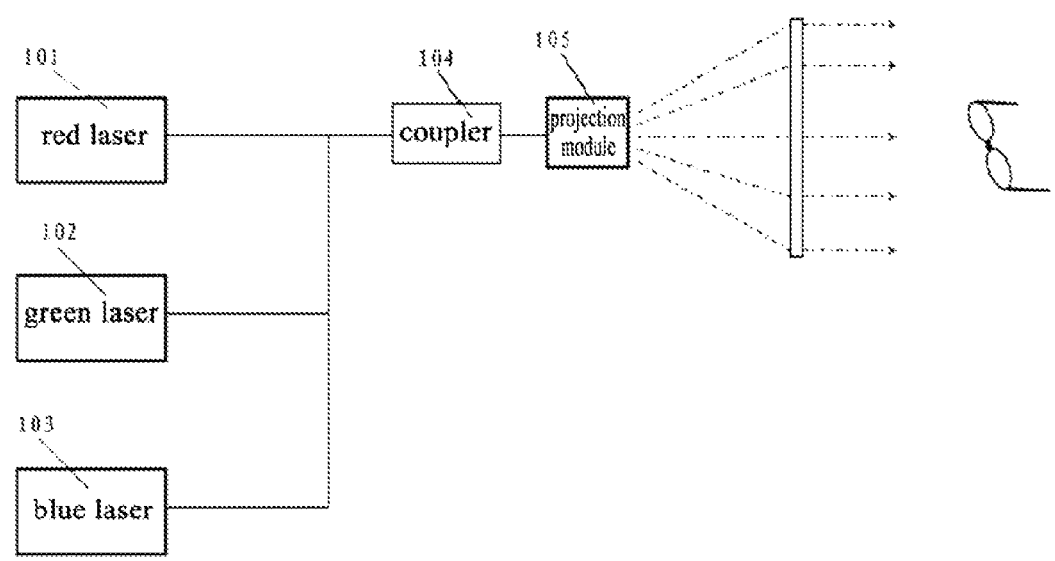
FIG. 2 is a schematic view of a LCD device in the first embodiment of the present invention.

As shown in FIGS. 1 and 2, specifically, the display light source comprises the red laser 101, the green laser 102 and the blue laser 103 which are wavelength tunable, wherein at the first time, the red laser 101 emits a first red laser beam, the green laser 102 emits a first green laser beam, the blue laser 103 emits a first blue laser beam, and the first red laser beam, the first green laser beam and the first blue laser beam are used for displaying the first frame of image; and at the second time, the red laser 101 emits a second red laser beam, the green laser 102 emits a second green laser beam, the blue laser 103 emits a second blue laser beam, and the second red laser beam, the second green laser beam and the second blue laser beam are used for displaying the second frame of image. The first frame of image and the second frame of image are captured from a same scene at different angles, and enter the left and right eyes of the viewer through the narrow-band filter glasses respectively, so that a 3D image is formed.

The principle of tuning the peak wavelength of laser beam emitted by the monochromatic laser will be described in details. In general, semiconductor material has a very wide gain bandwidth, for example the bandwidth of InGaAsP/InP material is 50 nm, and the bandwidth of quantum well material is 250 nm, so in theory, the semiconductor laser can be adjusted within this range. Refractive index of semiconductor material and wavelength corresponding to the maximum gain are susceptible to changes in temperature, pressure, carrier concentration and the electric field strength. Wavelength tuning by changing the carrier concentration is the most commonly used method. There are two structures for monolithic tunable semiconductor laser, the first one is based on Bragg reflection grating, such as multi-band DBR, and multi-electrode DFB. The wavelength tuning principle thereof is achieved mainly relying on changing the refractive index of the grating reflective region, and therefore changing the Bragg wavelength, wherein the maximum wavelength tuning range depends on the maximum variation range of the refractive index of the grating reflective region. Currently the maximum tuning range of such lasers by current injection is up to 10 nm. A grating is provided in the laser cavity for frequency selection and tuning.

Another structure for monolithic tunable semiconductor laser uses coupled cavity or non-matching grating, which vary the relationship between wavelength change and carrier concentration change, thus the tuning range is greatly expanded. Those monolithic tunable semiconductor lasers are for example vertical coupling filter type, superstructure grating DBR, Y-cavity type lasers and the like, the tuning range thereof may reach tens to one hundred nanometers.

Here are the performances of several tunable semiconductor lasers:

| laser structure | tuning range | linewidth (MHz) | tuning speed |
| --- | --- | --- | --- |
| multi-band DFB | several nm, continuous | less than several MHz | 0.1 ns |
| multi-band | several nm, | less than | 1 ns |
| DBR | continuous | 10 MHz | |
| integrated DFB | several nm, continuous | several MHz | Several ms |
| TTG | several nm, continuous | less than tens of MHz | 1 ns |
| SSGDBR | discontinuous 100 nm | less than tens of MHz | 0.1 ns |
| SGDBR | discontinuous 100 nm | less than tens of MHz | 0.1 ns |

As can be seen from the table, except for that the tuning speed of the integrated DFB is several ms, the corresponding speed of other lasers are extremely high, much higher than the corresponding speed of the projection system.

Further, since a very narrow wavelength linewidth is emitted by the laser, wavelength tuning in a small range has substantially no effect on the emission intensity, in other words, the final viewing would not be affected by minor fluctuations.

The basic principle of wavelength adjustment is that, the refractive index of the semiconductor material will change as the carrier concentration is varied (also the current is varied). The refractive index changes as the current intensity varied for three factors: 1, a band filling effect, i.e. with increase of the injected carriers, the Fermi level (Ef) of the conduction band and the valence band each moves to the high energy direction, which is equivalent to increase of band gap width; 2, a band shrinkage effect, which causes contrary result to that of the band filling effect; 3, a plasma effect. The first factor among the three has maximum influence.

Take the multi-electrode DBR-LD tunable semiconductor laser as an example, the structure is generally divided into three regions: a gain region, a phase shift region and a mode selection grating. The function of the phase shift region is to make the resonance wavelength $\lambda_m$ consistent with the Bragg wavelength $\lambda_b$, i.e. to meet the phase condition $\Phi1=\Phi2+2\pi m$, wherein $\Phi1$ is the phase variation in the grating region, $\Phi2$ is the phase variation in the gain region and the phase shift region. The Bragg distribution feedback grating selects a single longitudinal mode, and the gain region is used for adjusting output power. For a tunable DBR-LD laser, the wavelength tuning range can be expressed using the following formula:

$$\Delta\lambda = 2\Lambda\Delta n_{R,ef} = 2\Lambda\Gamma \cdot \frac{dn_{R,ef}}{dN}(J_d/eBt)^{1/2}$$

$\Lambda$ is the grating period, $\Delta n_{R,ef}$ is the effective refractive index change in the grating region, $\Gamma$ is a mode confinement factor, $$\frac{dn_{R,ef}}{dN}$$

is the refractive index change caused by the unit carrier concentration, B is a radiative composite coefficient, $J_d$ is an injected current density.

Seen from the above formula, a larger $\Gamma$, i.e. a thicker waveguide layer, corresponds to a larger tuning range; $\Delta\lambda$ becomes larger as the injected current increases, but thermal effects produced by excessively injected current may affect operation of the device, so the injected current shall not be too large.

Besides, the wavelength tuning range is also related to the component of the waveguide layer, more closer is the wavelength $\lambda_g$ to the laser wavelength, the larger is the tuning range.

Semiconductor material of red region includes: GaAlAs/GaAs, InGaP/GaAsP, InGaAlP.

Semiconductor material of blue region includes three types: SiC, nitride represented by GaN and II-IV semiconductor with wide band gap.

At present, the laser of green band is difficult to be obtained. Currently the methods for generating green laser include: 1, doubling frequency of Nd-doped lasers, which is most commonly used method for obtaining green laser, however, efficiency of such lasers is still too low, and the laser is bulky, expensive, sensitive to temperature, thus is not suitable for widely deployed in mass application; 2, InGaN semiconductor lasers provided on non-polarized and half polarized GaN substrate, currently such lasers may extend their continuous output wavelength to the green region of 520~525 nm; 3, VECSEL (vertical external-cavity surface-emitting laser) lasers, such method can provide more compact and miniaturized green laser by combining the semiconductor laser and convenience of the external cavity frequency doubling method; 4, obtaining the output of green light by directly using the near-infrared semiconductor laser module together with a one-time-obtained frequency doubling crystal, which results in lowered costs and highest integration degree, the length of such laser module is only 3.6 mm. The green lasers obtained in the methods 1 and 4 by using the frequency doubling principle are not suitable for wavelength tuning.

Figure 3:
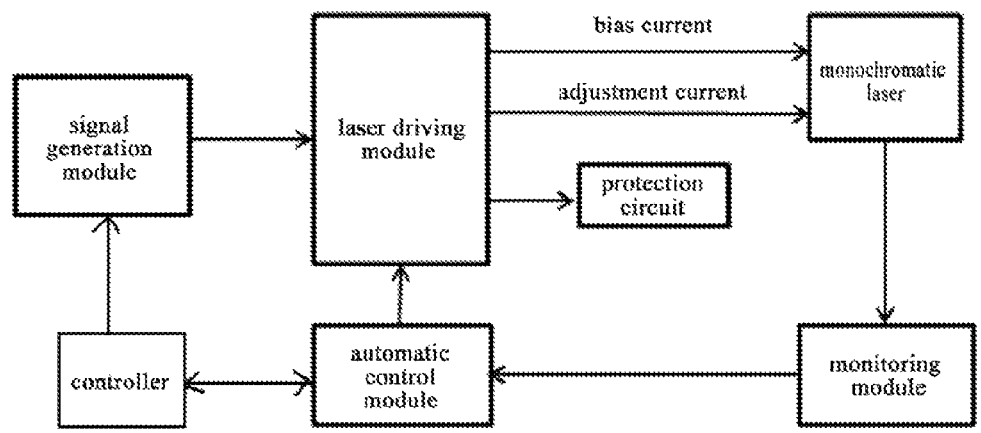
FIG. 3 is a principle view of laser output in the first embodiment of the present invention.

As shown in FIG. 3, since the wavelength of laser beam emitted by monochromatic laser may drift, and the output power of the monochromatic laser itself will change, in order to provide a stable laser beam emitted by the monochromatic laser, the display light source further comprises: a monitoring module, the monitoring module is connected to the corresponding monochromatic laser and is configured for detecting the peak wavelength of laser beam emitted by the monochromatic laser, the monitoring module also feedbacks the beam peak wavelength of the first laser beam or the second laser beam to the controller, so as to adjust the current output of the laser driving module. In other words, it is detected by the monitoring module whether the peak wavelength of the first laser beam or the second laser beam emitted by the monochromatic laser corresponds to the peak wavelength required by the image to be displayed, the bias current signal of the laser is feedback to the controller, the driving current is adjusted by the laser driver, such that the peak wavelength of the laser beam emitted by the monochromatic laser is controlled.

Further preferably, the display light source further comprises: an automatic control module. The monitoring module feedbacks the beam peak wavelength of the first laser beam or the second laser beam to the controller through the automatic control module, so as to adjust the current output of the laser driving module. Of course a protection circuit is also provided in the display light source, the protection circuit is connected with the laser driving module for protecting the laser driving module, and supplying corresponding driving current for the monochromatic laser.

Figure 4:
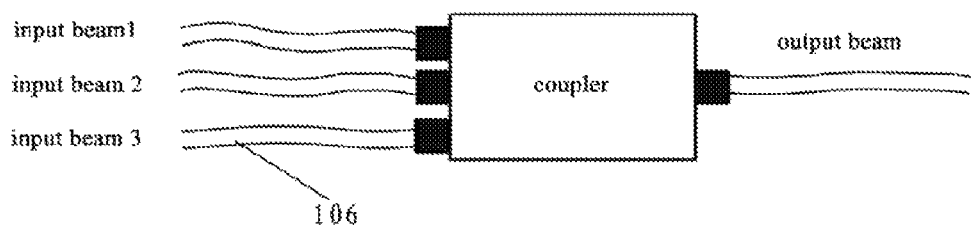
FIG. 4 is a schematic view of a coupler in the first embodiment of the present invention.
Figure 5:
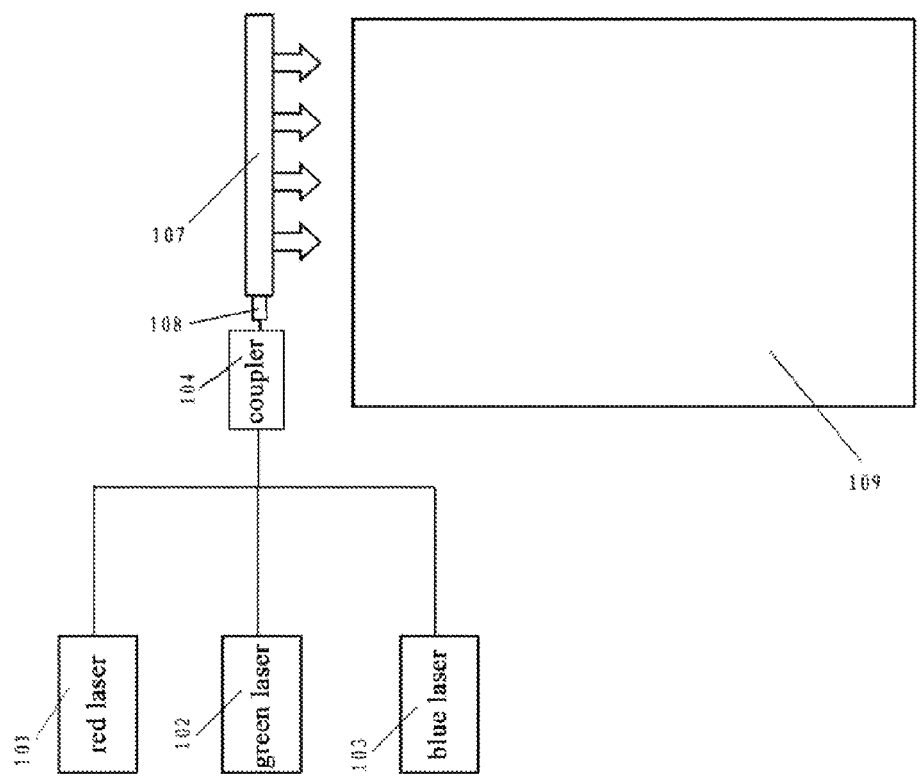
FIG. 5 is a structural view of a display light source in the first embodiment of the present invention.

Preferably, the display light source further comprises: a coupler 104. The monochromatic lasers are connected to the coupler 104 through the corresponding optical fibers 106 respectively, for combining the first laser beams or the second laser beams emitted at a same time into one laser beam via the coupler 104, and connecting with the display module through an optical fiber 106 for displaying images by the display device. Briefly, as shown in FIG. 4, the input beams 1, 2 and 3 are input to the coupler 104 through three different optical fibers 106 respectively, and are output through one optical fiber 106 after being combined by the coupler 104. The coupler 104 is generally a wavelength division multiplexer, and the input beams 1, 2 and 3 (i.e. the laser beams emitted by the respective monochromatic lasers) have characteristics of narrow-band spectrum, the spectrums corresponding to the first frame of image and the second frame of image formed by laser beams emitted in adjacent periods do not overlap or have few overlaps, and crosstalk can be avoided.

As shown in FIG. 1, the display device in the embodiment may be a back projection system. Further preferably, the display light source further comprises: a projection module 105. The projection module 105 is connected with the coupler 104 through an optical fiber 106, and is configured for processing the laser beams output from the coupler 104 and displaying the images through projection. That is, the image to be displayed is projected onto a screen by the projection module 105, the light is reflected to the eyes of the viewers. The display light source can be used in projection devices.

As shown in FIG. 2, the display device in the embodiment may be a back projection display device. The principle is similar to that in FIG. 1, except that the laser beam from the coupler 104 is directly irradiated onto the display screen of the display device through the projection device, at this time the corresponding video picture can be viewed.

Figure 6:
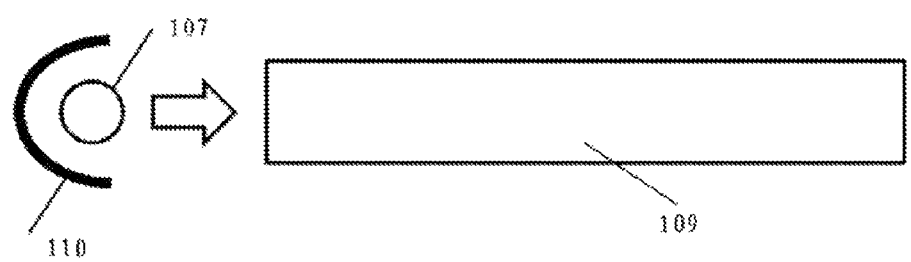
FIG. 6 is a cross-sectional view of FIG. 5 of the first embodiment of the present invention.

As shown in FIG. 6, the display device in the embodiment may be a liquid crystal display device. The display light source is the backlight in the liquid crystal display device. Further preferably, the display light source further comprises: at least one scattering rod 107 and a light guide plate 109. The scattering rod 107 is connected with the coupler 104 through an optical fiber 106, and is configured for scattering the laser beam from the coupler 104, and forming a surface light source by the light guide plate 109. When there is only one scattering rod 107, the scattering rod 107 may be disposed on a side of the light output surface of the light guide plate 109, which is equivalent to an side type backlight module; when there are a plurality of scattering rods 107, all the scattering rods 107 may be connected together and be disposed on a side away from the light output surface of the light guide plate 109, which is equivalent to a direct type backlight module. The display light source in the present embodiment increases light utility efficiency, thus a better display effect of the display device can be provided.

Figure 7:
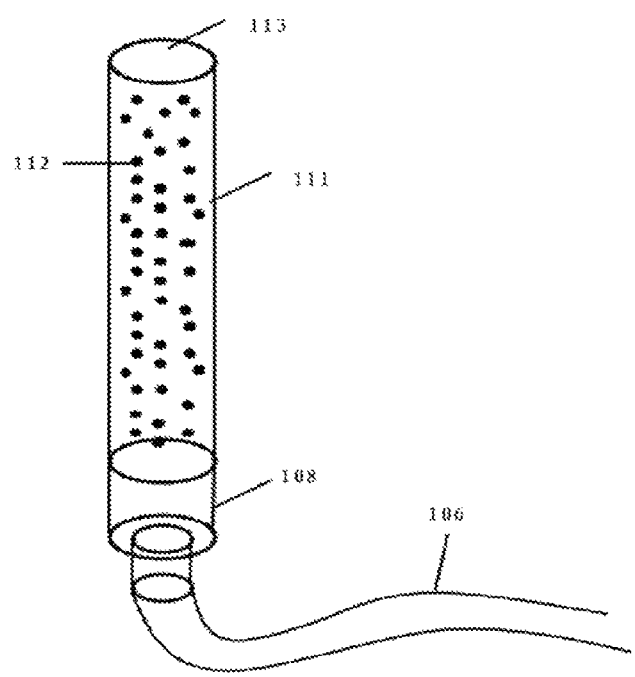
FIG. 7 is a structural view of a scattering rod in the first embodiment of the present invention.

As shown in FIG. 7, further preferably, the scattering rod 107 comprises: a scattering rod cavity, and scattering particles 112 provided in the scattering rod cavity, a laser inlet 108 is provided at one end of the scattering rod cavity for connecting with the optical fiber 106 and a reflector 113 is provided at the other end, the reflective shade 110 surrounds a side of the scattering rod cavity away from the light guide plate 109, the reflector 113 and the reflective shade 110 together reflect the laser beams to the light guide plate 109. Specifically, the scattering particles 112 in the scattering rod cavity scatter the light beams, since the scattering rod cavity is half surrounded by the reflective shade 110, the light beams are reflected from the scattering rod 107 by the reflective shade 110 together with the reflector 113 disposed at one end of the scattering rod 107 opposed to the inlet 108 for the optical fiber 106. The reflective shade 110 is disposed at a side of the light guide plate 109, wherein the scattering particles 112 may be acrylic particles or other substances having a scattering capability.

Figure 8:
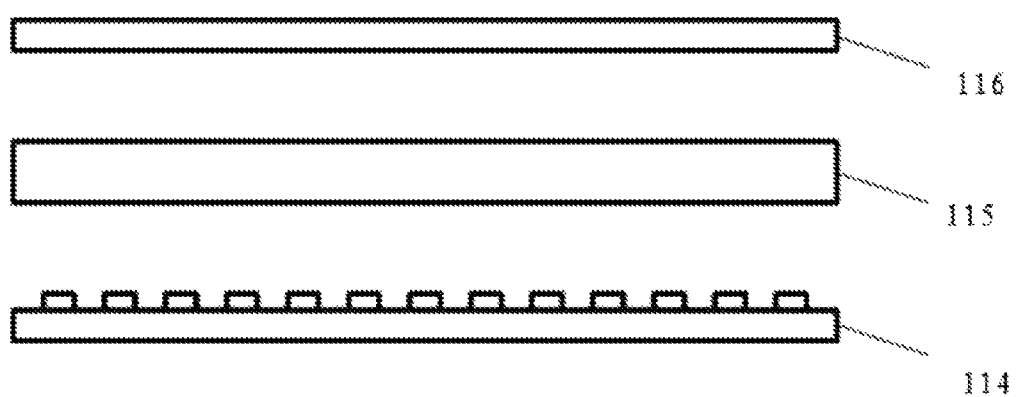
FIG. 8 is a structural view of another display light source in the first embodiment of the present invention.
Figure 9:
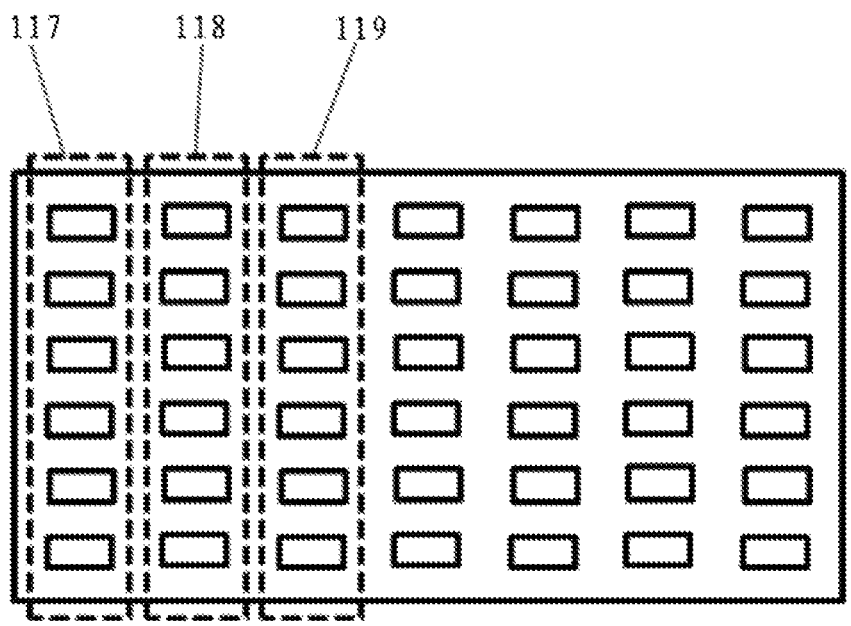
FIG. 9 is a schematic view of a laser light source array in the first embodiment of the present invention.

As shown in FIGS. 8 and 9, there is not only one structure for display light source. Preferably, the display light source is a laser light source array 114. The laser light source array 114 comprises a red laser light source 117, a green laser light source 118, a blue laser light source 119 which are disposed with space, and each of the red laser light source 117, a green laser light source 118, the blue laser light source 119 includes at least one laser light. A diffusion plate 115 is provided above the laser light source array 114 for diffusing light from the laser light source array 114, the transmitted light rays will be diffused evenly, the light emitting angle is increased, and the light is output through the diffusion plate 115 and an optical patch 116. As a display light source, the laser array is disposed at a similar position to that of the scattering rod 107, which can be provided on a side of the light guide plate 109 away from the light output surface, as a direct type display light source; or it can be provide on a side surface as to the light output surface of the light guide plate 109. Note that the red laser light source 117, a green laser light source 118, the blue laser light source 119 are all wavelength tunable, and the wavelength tuning can be performed by current adjustment, as described in above embodiments. The laser light source is of course not limited to the red laser light source 117, a green laser light source 118, the blue laser light source 119, it can be laser light source of other colors, provided that it is wavelength tunable.

The display light sources of both the back projection display device and the liquid crystal display device in the present embodiment have compact structure and reduced costs.

It should be understood that, the implementations described above are merely exemplary implementations for describing the principle of the present invention, but the present invention is not limited thereto. For the persons skilled in the art, various variations and improvements may be made without departing from the spirit and essence of the present invention, and these variations and improvements shall be deemed as falling within the protection scope of the present invention.

The invention claimed is:

1. A display device, comprising:
    a display light source, the display light source comprises at least three monochromatic wavelength tunable lasers,
    when displaying each piece of 3D images, the monochromatic laser is capable of at least emitting a first laser beam at a first time, and emitting a second laser beam at a second time, and the peak wavelength of the first laser beam is different from that of the second laser beam, wherein the first time and the second time are continuous, the first laser beam is used for displaying the first frame of image, the second laser beam is used for displaying the second frame of image,
    wherein the monochromatic laser is any one from a red laser, a green laser and a blue laser;
    the first laser beam includes a first red laser beam, a first green laser beam and a first blue laser beam, wherein at the first time, the red laser emits the first red laser beam, the green laser emits the first green laser beam, the blue laser emits the first blue laser beam;
    the second laser beam includes a second red laser beam, a second green laser beam and a second blue laser beam, wherein at the second time, the red laser emits the second red laser beam, the green laser emits the second green laser beam, the blue laser emits the second blue laser beam.

2. The display device of claim 1, wherein the display light source further comprises: a signal generation module, a laser driving module and a controller,
    the controller controls the signal generation module to generate different current signals, the signal generation module supply the different current signals to the laser driving module, the laser driving module generates different driving currents based on the received different current signals for driving the corresponding monochromatic laser to emit the first laser beam or the second laser beam.

3. The display device of claim 2, wherein the display light source further comprises: a monitoring module,
    the monitoring module is connected to the corresponding monochromatic laser and is configured for detecting the peak wavelength of laser beam emitted by the monochromatic laser, the monitoring module also feedbacks the beam peak wavelength of the first laser beam or the second laser beam to the controller, so as to adjust the current output of the laser driving module.

4. The display device of claim 3, wherein the display light source further comprises: an automatic control module,
    the monitoring module feedbacks the beam peak wavelength of the first laser beam or the second laser beam to the controller through the automatic control module, so as to adjust the current output of the laser driving module.

5. The display device of claim 4, wherein the display light source is a laser light source array,
    the laser light source array comprises a red laser light source, a green laser light source, a blue laser light source which are disposed with space, and each of the red laser light source, the green laser light source and the blue laser light source include at least one laser light.

6. The display device of claim 2, wherein the display light source is a laser light source array,
    the laser light source array comprises a red laser light source, a green laser light source, a blue laser light source which are disposed with space, and each of the red laser light source, the green laser light source and the blue laser light source include at least one laser light.

7. The display device of claim 3, wherein the display light source is a laser light source array,
    the laser light source array comprises a red laser light source, a green laser light source, a blue laser light source which are disposed with space, and each of the red laser light source, the green laser light source and the blue laser light source include at least one laser light.

8. The display device of claim 1, wherein the display light source is a laser light source array,
    the laser light source array comprises a red laser light source, a green laser light source, a blue laser light source which are disposed with space, and each of the red laser light source, the green laser light source and the blue laser light source include at least one laser light.

9. The display device of claim 1, wherein the display light source further comprises: a coupler, the monochromatic lasers are respectively connected to the coupler through optical fiber, for transmitting the first laser beam or the second laser beam emitted at a same time to the display module through the same propagation path via the coupler, so that the display device displays images.

10. The display device of claim 9, wherein the display light source further comprises: a projection module, the projection module is disposed between the coupler and the display module, and is configured for processing the laser beams output from the coupler and projecting them on the display module to display the corresponding image.

11. The display device of claim 9, wherein the display light source further comprises: at least one scattering rod and a light guide plate, the scattering rod is used for scattering the laser beam from the coupler, and forming a surface light source by the light guide plate.

12. The display device of claim 11, wherein the display light source further comprises a reflective shade, the scattering rod comprises: a scattering rod cavity, and scattering particles provided in the scattering rod cavity, a laser inlet is provided at one end of the scattering rod cavity and a reflector is provided at the other end, the reflective shade is disposed on a side of the scattering rod cavity away from the light guide plate, the reflector and the reflective shade together reflect the laser beams to the light guide plate.

13. The display device of claim 1, wherein the display light source is a laser light source array, the laser light source array comprises a red laser light source, a green laser light source, a blue laser light source which are disposed with space, and each of the red laser light source, the green laser light source and the blue laser light source include at least one laser light.

* * * * *